United States Patent
Omi

(10) Patent No.: US 7,916,169 B2
(45) Date of Patent: Mar. 29, 2011

(54) FACE IMAGE CAPTURE APPARATUS

(75) Inventor: Takuhiro Omi, Anjo (JP)

(73) Assignee: DENSO CORPORATION, Kariya (JP)

( * ) Notice: Subject to any disclaimer, the term of this patent is extended or adjusted under 35 U.S.C. 154(b) by 336 days.

(21) Appl. No.: 12/155,019

(22) Filed: May 29, 2008

(65) Prior Publication Data

US 2008/0303915 A1  Dec. 11, 2008

(30) Foreign Application Priority Data

Jun. 7, 2007  (JP) ................................ 2007-152076

(51) Int. Cl.
  *H04N 7/18* (2006.01)
  *H04N 5/225* (2006.01)
  *G06K 9/00* (2006.01)

(52) U.S. Cl. ............ 348/77; 348/78; 348/143; 348/169; 382/117; 382/118

(58) Field of Classification Search .................. None
  See application file for complete search history.

(56) References Cited

U.S. PATENT DOCUMENTS

| | | |
|---|---|---|
| 2006/0210124 A1 | 9/2006 | Ishii |
| 2006/0279726 A1 | 12/2006 | Galambos |
| 2007/0263099 A1 * | 11/2007 | Motta et al. ................ 348/222.1 |

FOREIGN PATENT DOCUMENTS

| | | |
|---|---|---|
| JP | A-9-282452 | 10/1997 |
| JP | 10-105898 | * 4/1998 |
| JP | A-10-105898 | 4/1998 |
| JP | A-2007-025758 | 2/2007 |
| WO | WO2005/008566 | * 1/2005 |

OTHER PUBLICATIONS

U.S. Appl. No. 12/081,798, filed Apr. 22, 2008, Omi.
First Office Action dated Apr. 28, 2010 issued from the Chinese Patent Office in the corresponding Chinese patent application No. 200810108277.0 (with English translation).
U.S. Appl. No. 12/081,798, filed May 29, 2008, Omi.

\* cited by examiner

*Primary Examiner* — Lin Ye
*Assistant Examiner* — Euel K Cowan
(74) *Attorney, Agent, or Firm* — Posz Law Group, PLC

(57) ABSTRACT

A face image capture apparatus for a vehicle repeatedly performs an output of a difference image to an image ECU. When the number of times of outputs reaches a predetermined number of times, a bright face image from which an influence of disturbance light is not removed is outputted to the image ECU. Thereby, the image ECU can determine an environment (daytime, nighttime, etc.) outside the vehicle based on the bright face image outputted in addition to the difference image.

7 Claims, 7 Drawing Sheets

BRIGHT FACE IMAGE px IN DAYTIME
(FLOODLIGHT + ENVIRON. LIGHT)

ENVIRONMENT LIGHT FACE IMAGE pz IN DAYTIME
(ENVIRON. LIGHT ALONE)

DIFFERENCE IMAGE (px − pz) IN DAYTIME
(FLOODLIGHT + ENVIRON. LIGHT)

BRIGHT FACE IMAGE px IN NIGHTTIME
(FLOODLIGHT + ENVIRON. LIGHT)

ENVIRONMENT LIGHT FACE IMAGE pz IN NIGHTTIME
(ENVIRON. LIGHT ALONE)

DIFFERENCE IMAGE (px − pz) IN NIGHTTIME
(FLOODLIGHT + ENVIRON. LIGHT)

FACE IMAGE CAPTURE APPARATUS

CROSS REFERENCE TO RELATED APPLICATION

This application is based on and incorporates herein by reference Japanese Patent Application No. 2007-152076 filed on Jun. 7, 2007.

FIELD OF THE INVENTION

The present invention relates to a face image capture apparatus suitable for capturing an image of a face of a driver inside of a vehicle.

BACKGROUND OF THE INVENTION

A technology is proposed to extract a face image which is not influenced by disturbance light (for example, refer to Patent Document 1). A difference image is obtained from a bright capture image, which is captured with a light source lighted up, and a dark capture image, which is captured without a light source lighted up. If a person is present, a face mask of the person is generated and the background is removed. A face image is thereby extracted from the difference image.

Patent Document 1: JP 2007-25758 A

If a face image from which an influence of disturbance light is removed is used to detect sleepiness or drowsiness of a driver, an environment of an outside of the vehicle cannot be grasped from the face image. When the driver narrows his/her eyes, it may be therefore difficult to determine whether narrowing the eyes is caused by the sunlight incident or the sleepiness.

SUMMARY OF THE INVENTION

The present invention is made in view of the problem above. It is an object to provide a face image capture apparatus capable of distinguishing an environment of an outside of a vehicle.

According to an example of the present invention, a face image capture apparatus for a vehicle is provided as follows. A camera is configured to repeatedly capture a face image which is an image of a face of an occupant in the vehicle. A floodlight is configured to irradiate the face of the occupant. A floodlight control device is configured to control the floodlight with respect to at least one of (i) switching between turning on a light and turning off a light and (ii) a quantity of light at turning a light, so as to perform an adjustment of an irradiation state of a light radiated to the face of the occupant. An image capture control device is configured to control a capturing time for capturing the face image in synchronization with the adjustment of the irradiation state. A difference image generation device is configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated. An image output device is configured to repeatedly output the difference image generated by the difference image generation device. Herein, the image output device includes an output condition determination unit configured to determine whether a condition is satisfied for outputting at least one face image of (i) the bright face image and (ii) the environment light face image. When it is determined that the condition is satisfied, the image output device is configured to output the at least one face image in addition to the difference image.

According to another example of the present invention, a face image capture apparatus for a vehicle is provided as follows. A camera is configured to repeatedly capture a face image which is an image of a face of an occupant in the vehicle. A floodlight is configured to irradiate the face of the occupant. A floodlight control device is configured to control the floodlight in at least one of (i) switching between turning on a light and turning off a light and (ii) a quantity of light at turning a light, so as to perform an adjustment of an irradiation state of a light radiated to the face of the occupant. An image capture control device is configured to control a capturing time for capturing the face image in synchronization with the adjustment of the irradiation state. A difference image generation device is configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated. An image output device is configured to repeatedly output the difference image generated by the difference image generation device. Herein, the image output device includes an output condition determination unit configured to determine whether a condition is satisfied for outputting a luminance value of a predetermined area of a face image of at least one face image of (i) the bright face image and (ii) the environment light face image. When it is determined that the condition is satisfied, the image output device is configured to output the luminance value in addition to the difference image.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments according to the present invention will be explained with reference to drawings. The present embodiments explain cases where a face image of a driver in a vehicle is captured using a face image capture apparatus.

First Embodiment

Figure 1:
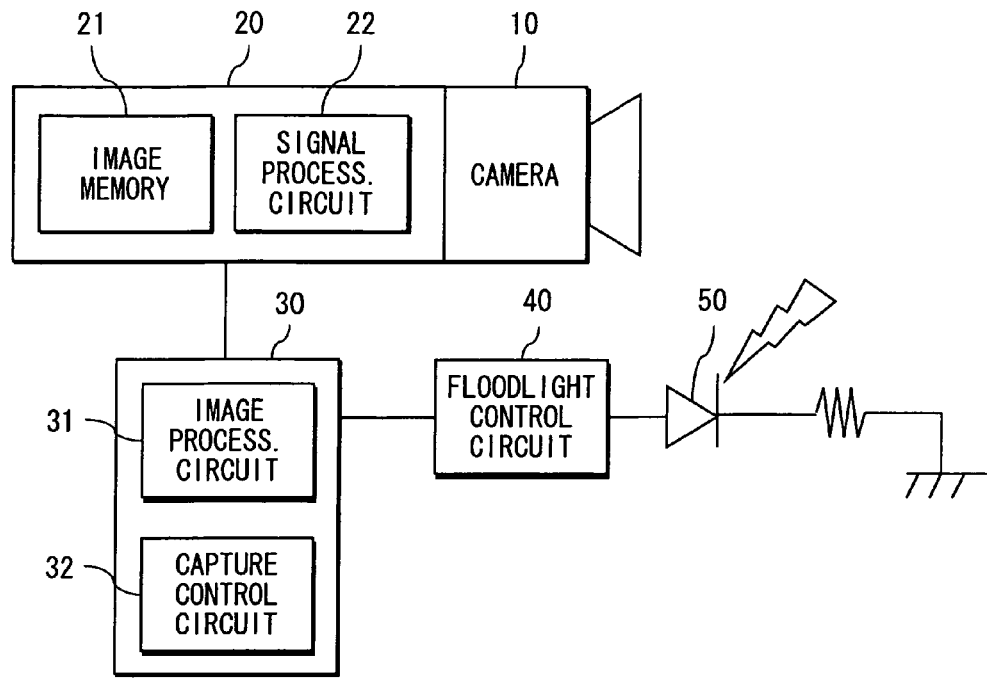
FIG. 1 is a block diagram illustrating a configuration of a face image capture apparatus according to embodiments of the present invention.

FIG. 1 is a block diagram illustrating a configuration of a face image capture apparatus according to embodiments of the present invention. As illustrated in FIG. 1, the face image capture apparatus includes a camera 10, a camera device 20 integrated with the camera 10, an image ECU (Electronic Control Unit) 30, a floodlight control circuit or device 40, and a floodlight 50.

Figure 2:
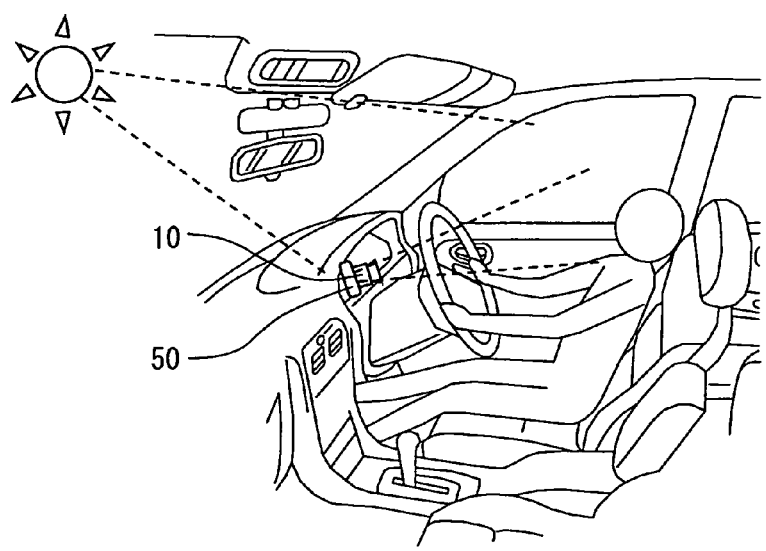
FIG. 2 is a view illustrating an arrangement of a camera and a floodlight in a compartment inside of a vehicle.
Figure 4:
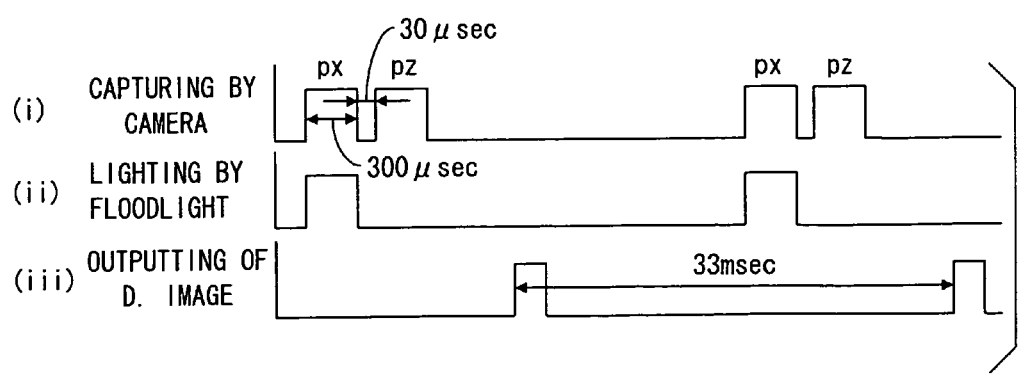
FIG. 4 is a timing chart illustrating image capturing by the camera, lighting by the floodlight, and outputting of difference images.

The camera 10 is used to capture an image of a face (face image) of a driver or occupant in a compartment inside of the vehicle, as illustrated in FIG. 2. The camera 10 is arranged near an instrument panel in the compartment of the vehicle. The camera 10 adopts an imager which can capture an image at a high speed. A capturing time interval of about 30 microseconds can be inserted between serial image capturing time periods each having about 300 microseconds as shown in FIG. 4.

The camera device 20 includes an image memory 21 and a signal processing circuit 22. The image memory 21 is a memory device for storing image information of images captured by the camera 10. The signal processing circuit 22 reads image information stored in the image memory 21, and functions as a difference image generation device to execute a difference image generation process to be mentioned later. The signal processing circuit 22 further functions as an image output device to output the generated image information such as a difference image to the image ECU 30.

The image ECU 30 includes an image processing circuit or device 31 and an image capture control circuit or device 32. The image processing circuit 31 receives the image information outputted from the camera device 20. The image processing circuit 31 detects a face area or face portion of the driver from the received image information or performs image processing for detecting a line of sight of the driver. The image capture control circuit 32 controls an image capturing time of the camera 10 synchronizing with an adjustment of an irradiation state by the floodlight control circuit 40, and further controls an exposure time period or an output gain, etc. of the camera 10.

Figure 3:
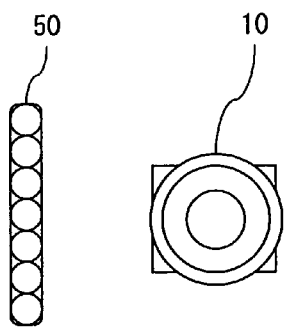
FIG. 3 is a view illustrating a positional relationship between an optical axis of the camera and the floodlight viewed from a driver.

The floodlight control circuit 40 controls (1) switching between tuning on and turning off the floodlight 50 or (ii) a quantity (or intensity) of light when turning on the floodlight 50. As illustrated in FIGS. 2, 3, the floodlight 50 is arranged adjacent to the camera 10, and a longitudinal direction of the floodlight 50 is positioned vertically. The floodlight control circuit 40 adjusts the irradiation state of the light radiated to the driver's face synchronizing with a capturing time of the camera 10.

As illustrated in FIG. 3, the floodlight 50 is equipped with multiple luminous sources, which can radiate an infrared light or near-infrared light having a center wavelength of about 850 to 950 nm. The multiple luminous sources are arranged along with the longitudinal direction or vertical direction of the driver's face and irradiate the driver's face.

Figure 5A:
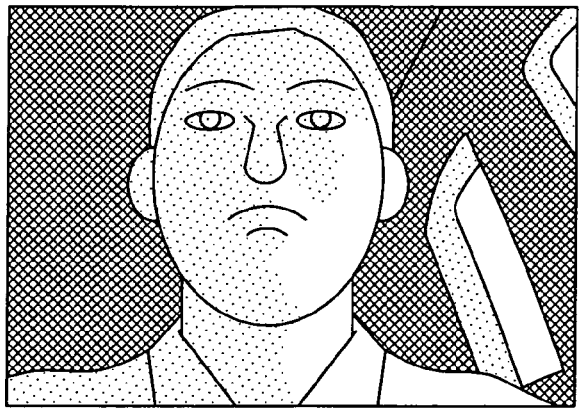
FIGS. 5A, 5B, 5C are examples in the daytime of a bright face image, an environmental light face image, and a difference image, respectively.

Next, an operation of the face image capture apparatus is explained. FIG. 4 is a timing chart illustrating (i) an image capturing time of the camera 10, (ii) a lighting time of the floodlight 50, and (iii) an outputting time for difference images generated from face images captured by the camera 10. The face image capture apparatus captures a bright face image px in FIG. 5A or FIG. 5D using the camera 10 at first. The bright face image px is captured in an irradiation state where light radiated to the driver's face is mainly shared or occupied by light of the floodlight 50. Herein, in fact, not only the light of the floodlight 50 but also an environment light (sunlight, reflected sunlight, etc.) around the driver is radiated to the driver's face. Herein, the image capturing time or time period for the bright face image px is set to about 300 microseconds. After the image capture of the bright face image px is completed, the captured image information is temporarily stored in the image memory 21.

Figure 5B:
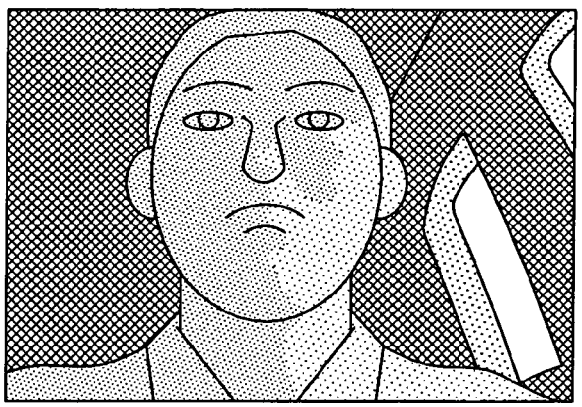
Figure 5C:
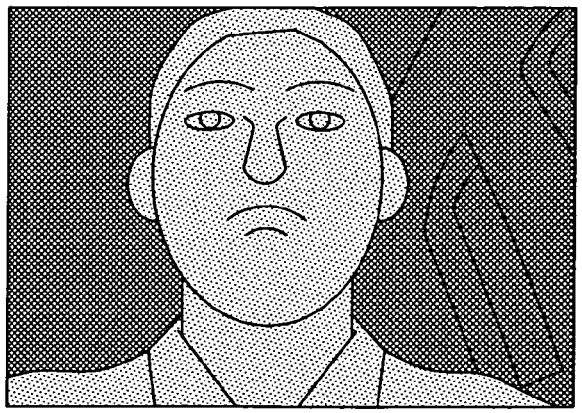
Figure 5D:
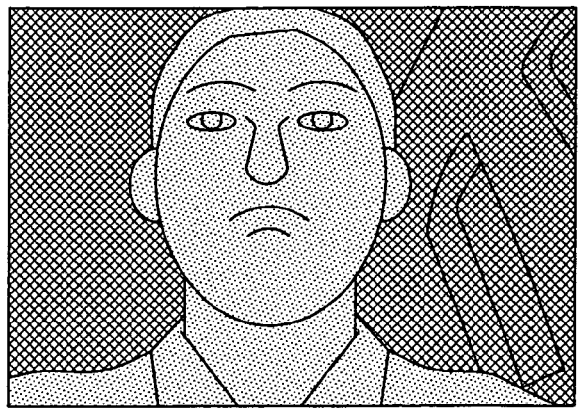
FIGS. 5D, 5E, 5F are examples in the nighttime of a bright face image, an environmental light face image, and a difference image, respectively.
Figure 5E:
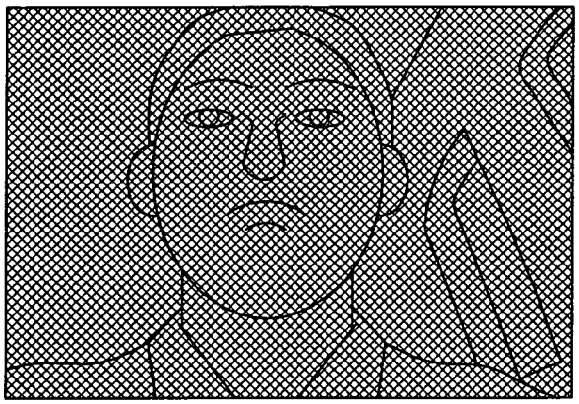
Figure 5F:
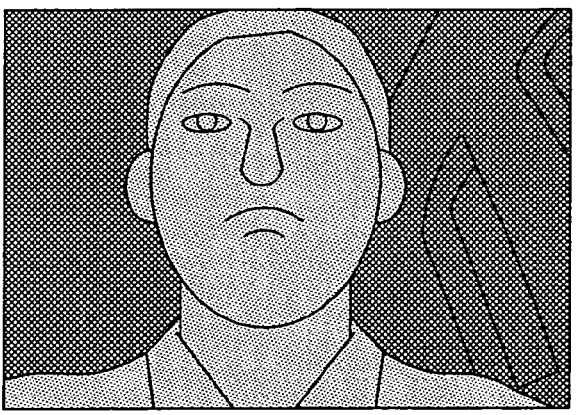

In about 30 microseconds thereafter, the face image capture apparatus captures an environment light face image pz using the camera 10. The environment light face image pz in FIG. 5B or FIG. 5E is captured in an irradiation state where light radiated or incident to the driver's face is mainly shared or occupied by an environment light near the driver. Herein, it may be possible that the light radiated by the floodlight 50 is simultaneously radiated with the light quantity adjusted as being reduced to a very low level. Herein, the capturing time period for the environment light face image pz is set to about 300 microseconds equal to that for the bright face image px. After the image capture of the environment light face image pz is completed, the captured image information is temporarily stored in the image memory 21.

Further, the camera 10 adopts an imager which can capture an image continually at a high speed. Therefore, even if the face images are captured with time sharing as mentioned above, the face images are not influenced by positional variation of the driver for the corresponding time interval therebetween. The positional variation may be caused by motion of the driver taking place spontaneously or accompanying vibration of the vehicle. In addition, the time lag between the capturing times for the bright face image px and the environment light face image pz is relatively short. Thus it can be regarded as simultaneous image capturing of both the images; therefore, the change in the environment light for the time lag can be also usually disregarded.

The bright face image px and the environment light face image pz are thus captured. The signal processing circuit 22 then generates a difference image by calculating a difference in the luminance using the image information of the bright face image px and environment light face image pz, both of which are stored temporarily in the image memory 21. This may be called a difference image generation process.

For instance, the difference is calculated with respect to mutually corresponding pixel positions of the bright face image px and environment light face image pz by subtracting the luminance value of the environment light face image pz from that of the bright face image px. Herein, generation of the difference image is explained in detail.

First, the bright face image px is a face image captured when the main portion of the light incident or radiated to the driver's face is light radiated from the floodlight 50. The luminance value is thereby high in the driver's face area which the light from the floodlight 50 fully reaches. In contrast, the light from the floodlight 50 does not relatively reach a background area surrounding the driver's face area. The luminance value in the background area is relatively low when the reflected image of the background area is captured by the camera 10.

Further, the environment light image pz is a face image captured when the main portion of the light incident to the driver's face is an environment light. Therefore, in the environment light image pz, the luminance value in the driver's face area is low in comparison with that of the bright face image px. With respect to the background area or object which is present farther from the floodlight 50 than the face area, the luminance value is not relatively affected by the floodlight 50. Thus, the luminance values in the face area and the background area are relatively similar to each other.

In addition, the sunlight such as the afternoon sun may be incident into the compartment of the vehicle and irradiate the driver's face. In such a case, in comparison between the bright face image px and the environment light face image pz, the luminance value is much higher in the bright face image px in the face area of the driver irradiated by the floodlight 50. Thus, a difference image (px−pz) can be generated as being highlighting a difference in the luminance value by calculating a difference by subtracting the luminance value of the environment light face image pz from that of the bright face image px, as illustrated in FIG. 5C. This enables a generation of a difference image (px−pz) from which the influence of environment light (disturbance light) such as the sunlight is removed.

Once the difference image (px−pz) is generated, the signal processing circuit 22 outputs the image information to the image ECU 30 every about 33 milliseconds as illustrated in FIG. 4. In such a case, in the present embodiment, whenever the number of times of outputs of the difference image (px−pz) reaches a predetermined number of times, a bright face image px is captured. The captured bright face image px, from which an influence of disturbance light is not removed, is then outputted to the image ECU 30. Thus, in the image ECU 30, the environment (daytime or nighttime) outside of the vehicle can be determined from the bright face image from which an influence of disturbance light is not removed.

In other words, there is a case where the whole of the bright face image px is high in a luminance value, for example, an integral image is over a threshold value. In such a case, it is assumed that the sunlight is incident directly or reflectedly into the compartment of the vehicle or a headlight of an oncoming vehicle is incident; thereby, it may be determined that an outside is in the daytime or a strong light is incident. In contrast, there is a case where (i) the other area other than the certain area, e.g., face area, in the bright face image or (ii) the whole of the environment light face image is approximately uniformly dark. That is, there is a case where an extremely bright local area is not present and an integral image is below the threshold value. In such a case, it can be determined that an outside of the vehicle is in the nighttime, in a dark indoor parking lot, or in a tunnel.

Figure 6:
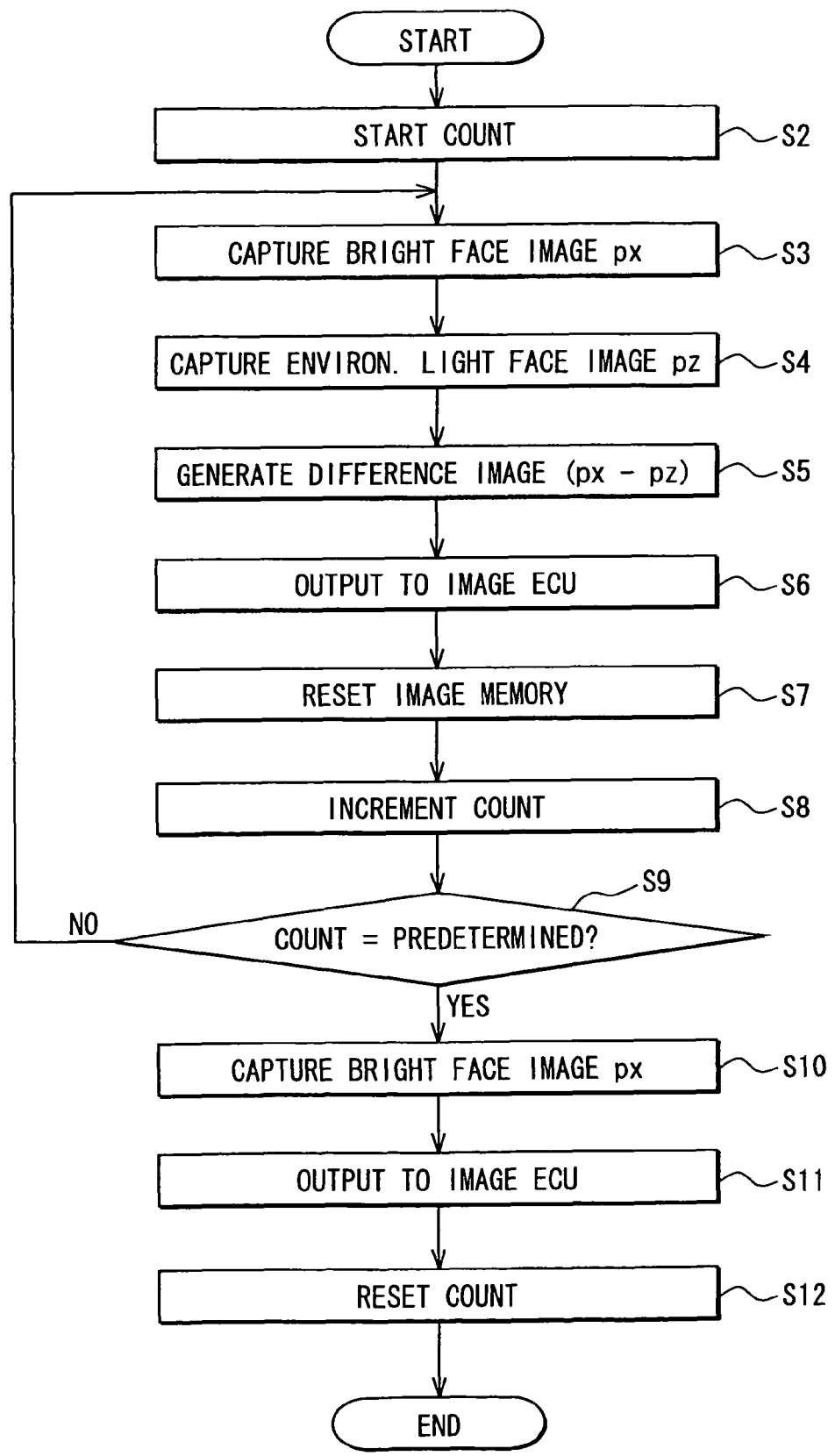
FIG. 6 is a flow chart for explaining a difference image generation process according to a first embodiment of the present application.

Next, the difference image generation process for generating a difference image performed by the signal processing circuit 22 is explained using a flowchart illustrated in FIG. 6. The process takes place after the image capture control circuit 32 is started. At S2, a counter which counts the number of times of outputs of the difference image (px−pz) is started.

At S3, a bright face image px is captured, and the captured image information is stored in the image memory 21. At S4, an environment light face image pz is captured, and the captured image information is stored in the image memory 21. At S5, a difference image (px−pz) is generated or calculated by taking a difference of the luminance value by subtracting the luminance value of the environment light face image pz from the luminance value of the bright face image px with respect to the corresponding pixel positions thereof.

At S6, the generated difference image (px−pz) is outputted to the image ECU 30. At S7, the image memory 21 is reset, thereby eliminating the stored image information. At S8, the count of the counter is then incremented by one time. At S9, it is determined whether the count of the counter reaches the predetermined number of times or not. When affirmative determination is made at S9, the processing proceeds to S10. When negative determination is made at S9, the processing returns to S3 to repeat the above.

At S10, a bright face image px is captured similarly at S3, and the captured image information is stored in the image memory 21. At S11, the image information of the captured bright face image px is outputted to the image ECU 30. At S12, the count of the counter is reset and the process is once terminated. The process is then repeated from S2 while the image capture control circuit 32 is turned on.

As mentioned above, the face image capture apparatus repeatedly performs an output of a difference image (px−pz) to the image ECU 30. When the number of times of outputs reaches a predetermined number of times, a captured bright face image px from which an influence of disturbance light is not removed is outputted to the image ECU 30. Thereby, the image ECU 30 can determine an environment (daytime, nighttime, etc.) outside the vehicle based on the bright face image px outputted in addition to the difference images (px−pz). Thus, the signal processing circuit 22 functions as an output condition determination means, unit, or device.

(Modification 1)

In the present first embodiment, when the number of times of outputs of the difference image (px−pz) reaches a predetermined number of times, a bright face image px is captured. Instead, an environment light face image pz may be captured and outputted to the image ECU 30. Like the bright face image px, the environment light face image pz is an image from which an influence of disturbance light is not removed. Thus, an environment (daytime, nighttime, etc.) outside of the vehicle can be also determined from the environment light face image pz.

(Modification 2)

In the first embodiment, the image ECU 30 can determine an environment (daytime, nighttime, etc.) outside the vehicle based on the bright face image px outputted in addition to the difference image (px−pz). Further, presence or absence of the driver's sleepiness may be determined based on the difference image (px−pz) and the bright face image px. In such a case, the image ECU 30 may function as a sleepiness determination means, unit, or device.

As explained above, it can be determined that the outside of the vehicle is in the daytime or an external light is incident when a certain area is brighter than other area in the bright face image or the environment light face image. In such a case, when it is clear from the difference image (px−pz) generated at this time that the driver narrows the eyes, it can be determined that the driver narrows the eyes because of dazzle due to the light incident into the compartment of the vehicle from an outside such as the sunlight or headlight from an oncoming vehicle.

In contrast, when (i) the other area other than the certain area, e.g., face area, in the bright face image px or (ii) the whole of the environment light face image pz is approximately uniformly dark, it can be determined that an outside of the vehicle is in the nighttime, in a dark indoor parking lot, or in a tunnel. When it is clearly understood from the difference image (px−pz) generated at this time that the driver narrows the eyes, it can be determined that the driver narrows the eyes because of sleepiness (i.e, the driver is drowsy).

In addition, like the modification 1, when an environment light face image pz is captured and outputted to the image ECU 30, the presence or absence of the driver's sleepiness can be determined based on the difference image (px−pz) and the environment light face image pz.

(Modification 3)

In the first embodiment, at S9 in FIG. 6, a condition is designated that the number of times of outputs of the difference image (px−pz) reaches a predetermined number of times. When the condition is satisfied, a bright face image px is captured and outputted to the image ECU 30. Alternatively, for instance, on a condition that a time point for outputting a difference image (px−pz) is reached, at least one of a bright face image px and an environment light face image pz may be captured and outputted to the image ECU 30. That is, simultaneously with a difference image (px−pz) outputted, at least one of an bright face image px and an environment light face image pz may be always captured and outputted to the image ECU 30.

In addition, another condition may be alternatively designated that an output instruction for outputting a difference image (px−pz) is issued to the camera device 20 from the image ECU 30 functioning as an input device for receiving the difference image (px−pz). When such a condition is satisfied, at least one of a bright face image px and an environment light face image pz may be captured and outputted to the image ECU 30. This enables a determination as to whether to output at least one image information of (i) a bright face image and (ii) an environment light face image, both of which an influence of disturbance light is not removed from.

Second Embodiment

A second embodiment has a configuration almost similar to that of the first embodiment. Detailed explanation is mainly made with respect to different portions therebetween. In the first embodiment, the face image capture apparatus outputs, in addition to a difference image (px−pz), a bright face image, from which an influence of disturbance light is not removed, to the image ECU 30.

In contrast, the second embodiment is different from the first embodiment in that the face image capture apparatus outputs, in addition to a difference image (px−pz), a luminance value in a predetermined area within a bright face image px, instead of the bright face image px itself. The predetermined area includes (i) at least one axis of the vertical axis and the horizontal axis passing through a face area capturing the driver's face or (ii) predetermined multiple points in the bright face image px.

When a certain area is brighter than other area in the bright face image px or the environment light face image pz, the luminance value is high in the certain area and low in the other area. Thus, a variation in the luminance value is observed in the vertical or horizontal axis passing through both the areas: therefore, it is assumed that the sunlight or external light is incident into the compartment of the vehicle. Thus, it is determined that the outside of the vehicle is in the daytime or an external light is incident.

In contrast, when (i) the other area other than the certain area, e.g., face area, in the bright face image px or (ii) the whole of the environment light face image pz is approximately uniformly dark, it can be determined that an outside of the vehicle is in the nighttime, in a dark indoor parking lot, or in a tunnel. Thus, the environment (daytime, nighttime, etc.) outside of the vehicle can be determined from the luminance value along at least one of the vertical axis and the horizontal axis, both of which pass through a predetermined area and an influence of disturbance light is not removed from.

Figure 7:
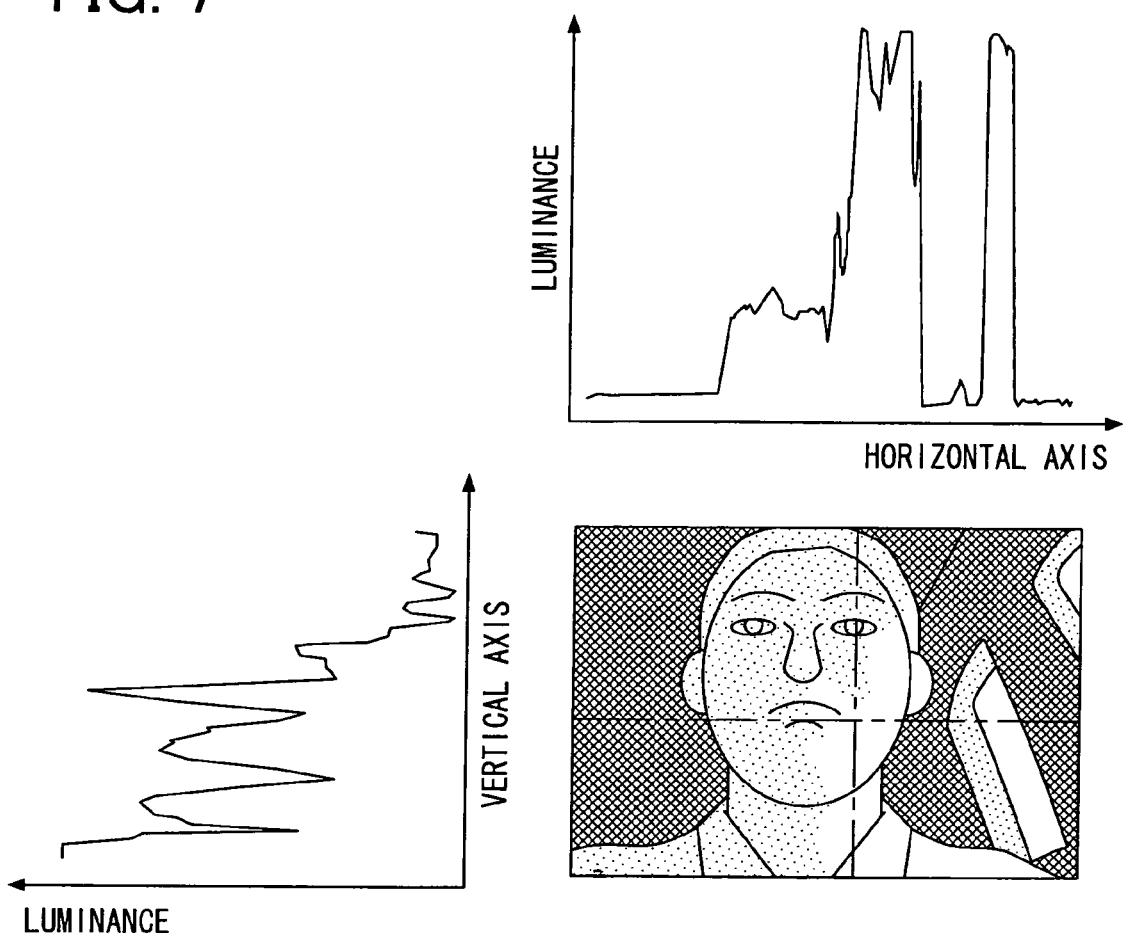
FIG. 7 illustrates variations of a luminance value along a vertical axis and a horizontal axis passing through a face area of a driver in a bright face image.

FIG. 7 shows a bright face image px captured when the sunlight is incident into the compartment of the vehicle and the sunlight is radiated to a part of the driver's face. In the state where there is no direct light to the face, variation appears in a luminance or brightness/darkness due to organs on the face or wrinkles or reflected light from the floodlight. In contrast, in the state where there is direct light in the bright face image px, more significant variation or increase appears in the luminance. Therefore, it can be determined that the outside of the vehicle is in the daytime or an external light is incident from the luminance values along the vertical axis and horizontal axis passing through the face area capturing the driver's face. In contrast, when no variation appears in the luminance along the above axis, it can be determined that an outside of the vehicle is in the nighttime, in a dark indoor parking lot, or in a tunnel.

Thus, an environment (daytime, nighttime, etc.) outside of the vehicle can be determined based on the luminance value along at least one axis of the vertical and horizontal axes passing through the face area capturing the driver's face in the bright face image px, which an influence of disturbance light is not removed from and which is outputted in addition to the difference image (px−pz).

Herein, to easily determine whether the sunshine irradiates the driver's face, at least one axis of the vertical axis and the horizontal axis may be designated to pass through a face area capturing the driver's face. Furthermore, such an axis may be further designated to pass through the center of the face area. It is because the driver narrows the eyes more as the sunlight incident into the compartment of the vehicle is closer to the driver's face.

In addition, the luminance value may not be limited to only those along at least one axis of the vertical axis and horizontal axis passing through the face area capturing the face of the driver in the bright face image px. The luminance value may be alternatively luminance values in multiple predetermined points (pixels) in the face area capturing the driver's face.

Figure 8:
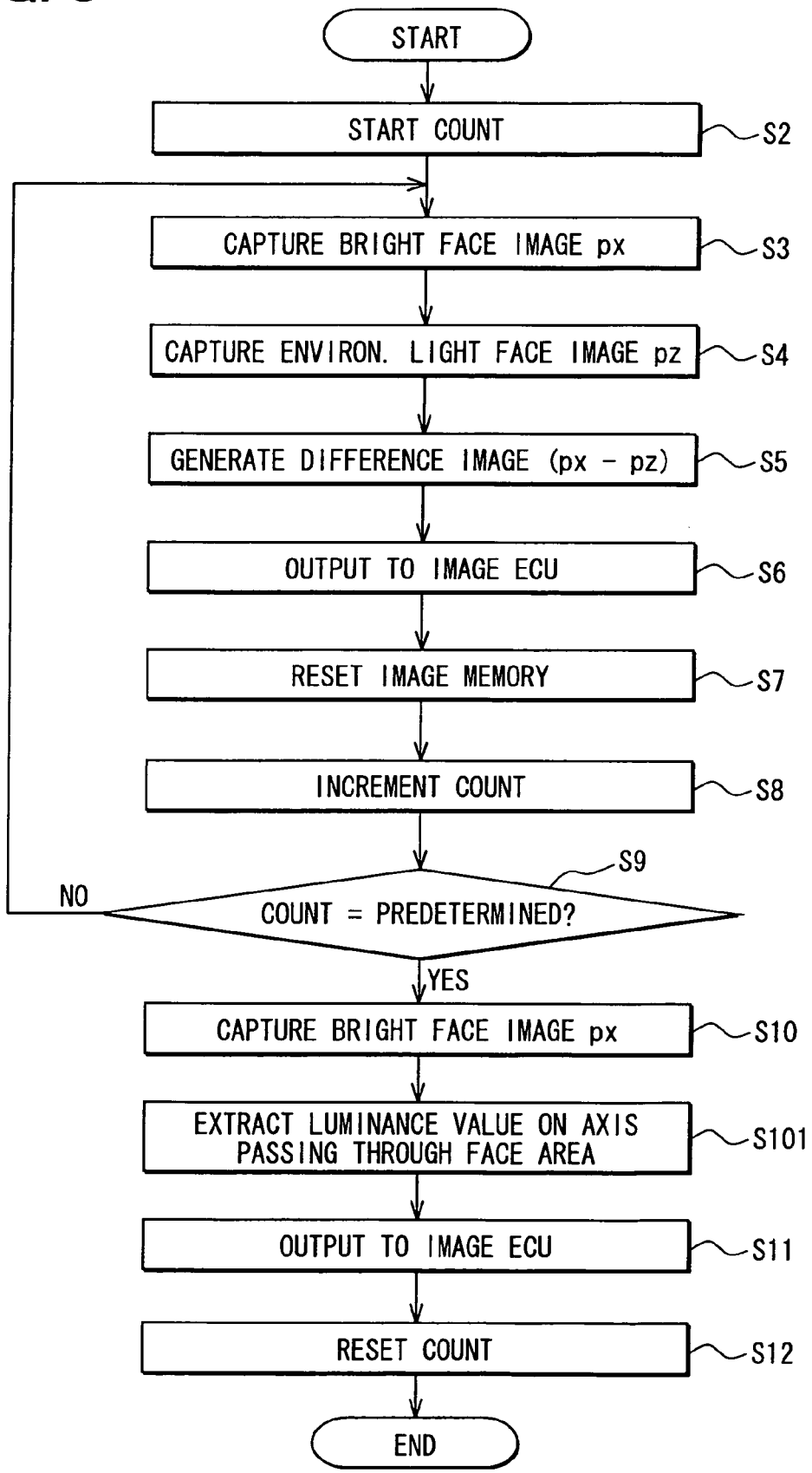
FIG. 8 is a flow chart for explaining a difference image generation process according to a second embodiment of the present application.

FIG. 8 illustrates a difference image generation process in the face image capture apparatus according to the second embodiment. FIG. 8 includes S101 in addition to the corresponding process in FIG. 6. At S101, the luminance value is extracted along at least one axis of the vertical axis and horizontal axis passing through the face area capturing the face of the driver in the bright face image px. At S11, the extracted luminance value is outputted to the image ECU 30.

Further, at S101 in the first-time process, the face area capturing the driver's face has not been designated. Therefore, the luminance value is extracted along at least one axis of the vertical axis and horizontal axis which pass through the center of the bright face image px. In the subsequent processes after the first-time process, based on the information about the face area acquired from the image ECU 30, at least one axis of the vertical axis and horizontal axis passing through the face area is designated. Then the luminance value is extracted along the designated axis.

(Modification 4)

In the second embodiment, each time the number of times of outputs of the difference image (px−pz) reaches a predetermined number of times, a bright face image px is captured. Alternatively, an environment light face image pz may be captured and the luminance value along at least one axis of the vertical axis and horizontal axis passing through the face area of the driver's face may be outputted to the image ECU 30. Like the bright face image px, the environment light face image pz is an image from which an influence of disturbance light is not removed. Thus, an environment (daytime, nighttime, etc.) outside of the vehicle can be determined from the environment light face image pz.

(Modification 5)

In the image ECU 30 of the second embodiment, an environment (daytime, nighttime, etc.) outside of the vehicle can be determined based on the luminance value along at least one axis of the vertical and horizontal axes passing through the face area capturing the driver's face in the bright face image px, which is outputted in addition to the difference image (px–pz). Furthermore, the presence or absence of the driver's sleepiness may be determined based on the difference image (px–pz) and the luminance value along at least one axis of the vertical axis and horizontal axis passing through the face area capturing the face of the driver in the bright face image px.

As explained above, if a variation which is beyond a threshold value is observed in the luminance value along at least one axis of the vertical axis and horizontal axis passing through the face area capturing the face of the driver in the bright face image px or environment light face image pz, it can be determined that the outside of the vehicle is in the daytime. This is because, when it is clearly understood from the difference image (px–pz) generated at this time that the driver narrows the eyes, it can be determined that the driver narrows the eyes because of the sunlight incident into the compartment of the vehicle.

In contrast, if no variation which is beyond the threshold value is observed in the luminance value along at least one axis of the vertical axis and horizontal axis passing through the face area capturing the face of the driver in the bright face image px or environment light face image pz, it is determined that the outside of the vehicle is in the nighttime. It is because, when it is clearly understood from the difference image (px–pz) generated at this time that the driver narrows the eyes, it can be determined that the driver narrows the eyes because of sleepiness (i.e., the driver is drowsy).

(Modification 6)

In the second embodiment, at S9 in FIG. 8, a condition is designated that the number of times of outputs of the difference image (px–pz) reaches a predetermined number of times. When such a condition is satisfied, a bright face image px is captured and the luminance value along at least one axis of the vertical axis and horizontal axis passing through the face area of the driver's face is outputted to the image ECU 30. Alternatively, another condition may be designated. For instance, on a condition that a time point for outputting a difference image (px–pz) is reached, at least one face image of a bright face image px and an environment light face image pz may be captured. Then, in the at least one captured face image, the luminance value along the at least one axis of the vertical axis and horizontal axis passing through the face area of the driver's face may be outputted to the image ECU 30. That is, simultaneously with a difference image (px–pz) outputted, at least one face image of a bright face image px and an environment light face image pz may be always captured. In the at least captured one face image, the luminance value along at least one axis of the vertical axis and horizontal axis passing through the face area of the driver's face may be outputted to the image ECU 30.

In addition, another condition may be alternatively designated that an instruction for outputting a difference image (px–pz) is issued from the image ECU 30 acting as an input device for receiving the difference image (px–pz). When such a condition is satisfied, at least one face image of a bright face image px and an environment light face image pz may be captured and the luminance value along at least one axis of the vertical axis and horizontal axis passing through the face area of the driver's face in the at least one face image captured may be outputted to the image ECU 30. This enables a determination as to whether to output the luminance value along at least one axis of the vertical axis and the horizontal axis passing through the face area capturing the driver's face in the at least one face image of the bright face image and the environment light face image from which an influence of disturbance light is not removed.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

According to a first aspect, a face image capture apparatus for a vehicle is provided as follows. A camera is configured to repeatedly capture a face image which is an image of a face of an occupant in the vehicle. A floodlight is configured to irradiate the face of the occupant. A floodlight control device is configured to control the floodlight with respect to at least one of (i) switching between turning on a light and turning off a light and (ii) a quantity of light at turning a light, so as to perform an adjustment of an irradiation state of a light radiated to the face of the occupant. An image capture control device is configured to control a capturing time for capturing the face image in synchronization with the adjustment of the irradiation state. A difference image generation device is configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated. An image output device is configured to repeatedly output the difference image generated by the difference image generation device. Herein, the image output device includes an output condition determination unit configured to determine whether a condition is satisfied for outputting at least one face image of (i) the bright face image and (ii) the environment light face image. When it is determined that the condition is satisfied, the image output device is configured to output the at least one face image in addition to the difference image.

There is a case where the luminance or luminance value of the whole image is high in the bright face image or the environment light face image. In such a case, it is assumed that the sunlight is incident directly or reflectedly into the compartment of the vehicle or a headlight of an oncoming vehicle is incident; thereby, it may be determined that an outside is in the daytime or a strong light is incident.

In contrast, there is a case where in the bright face image a face area is brighter than other area excluding the face area, i.e., an image reflected by the floodlight is dominant. In such a case, it is determined that an outside of the vehicle is in the nighttime, in a dark indoor parking lot, or in a tunnel.

In addition, in the environment light face image, when the whole image is dark, it is determined that an outside of the vehicle is in the nighttime, in a dark indoor parking lot, or in a tunnel. Herein, being "bright or dark" is defined as a quantity of a light incident via a camera lens or imager instead of sense recognized or sensed by a person via a camera. It is because an outputted image is darker when a shutter speed is quicker or the gain is made lower even if an outside of the vehicle is bright. Thus, the environment (for example, daytime or nighttime) outside of the vehicle can be determined from the bright face image or environment light face image, which an influence of disturbance light is not removed from.

As an optional aspect of the face image capture apparatus of the first aspect, a sleepiness determination device may be configured to determine presence or absence of a sleepiness of the occupant based on the at least one face image and the difference image, which are outputted by the image output device.

There is a case where a luminance, which is beyond a threshold value to thereby dazzle the driver, is observed as a determination result of an environment of an outside using a bright face image or environment light face image. In such a case, when it is clear from the difference image generated at this time that the driver narrows the eyes, it is determined that the driver narrows the eyes because of the light incident into the compartment of the vehicle from an outside such as the sunlight or headlight from an oncoming vehicle.

In contrast, when the bright face image or the environment light face image is approximately even in brightness or when the environment light face image is dark as a whole, it is determined that the outside of the vehicle is in the nighttime. When it is clear from the difference image generated at this time that the driver narrows the eyes, it can be determined that narrowing the eyes is caused by the sleepiness (i.e., the driver is drowsy).

According to a second aspect, a face image capture apparatus for a vehicle is provided as follows. A camera is configured to repeatedly capture a face image which is an image of a face of an occupant in the vehicle. A floodlight is configured to irradiate the face of the occupant. A floodlight control device is configured to control the floodlight in at least one of (i) switching between turning on a light and turning off a light and (ii) a quantity of light at turning a light, so as to perform an adjustment of an irradiation state of a light radiated to the face of the occupant. An image capture control device is configured to control a capturing time for capturing the face image in synchronization with the adjustment of the irradiation state. A difference image generation device is configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated. An image output device is configured to repeatedly output the difference image generated by the difference image generation device. Herein, the image output device includes an output condition determination unit configured to determine whether a condition is satisfied for outputting a luminance value of a predetermined area of a face image of at least one face image of (i) the bright face image and (ii) the environment light face image. When it is determined that the condition is satisfied, the image output device is configured to output the luminance value in addition to the difference image.

The luminance value herein indicates a normalized value which is not affected by an influence on an adjustment value such as a shutter speed or gain of the camera.

When a certain area is brighter than other area in the bright face image or the environment light face image, the luminance value of the certain area is higher than that of the other area. Thus, since a difference or variation is observed in the luminance value between the certain area and the other area, it is assumed that the sunlight or external light is incident into the compartment of the vehicle. Thus, it is determined that the outside of the vehicle is in the daytime or an external light is incident.

In contrast, when (i) the other area other than the certain area, e.g., face area, in the bright face image or (ii) the whole of the environment light face image is approximately uniformly dark, it can be determined that an outside of the vehicle is in the nighttime, in a dark indoor parking lot, or in a tunnel. Thus, the environment (daytime, nighttime, etc.) outside of the vehicle can be determined from the luminance value in a predetermined area. Herein, the luminance value in the predetermined area is outputted in addition to the difference image without being subjected to removal of an influence of disturbance light.

As an optional aspect of the face image capture apparatus of the second aspect, the predetermined area of the face image of the at least one face image may be defined as an image area where the face of the occupant is captured as an image in the at least one face image. It is because that it is easily determined whether the face of the occupant is irradiated by the sunlight incident.

As an optional aspect of the face image capture apparatus of the second aspect, a sleepiness determination device may be configured to determine presence or absence of a sleepiness of the occupant based on the difference image and the luminance value, which are outputted by the image output device.

As mentioned above, if a difference or variation which is beyond a threshold value in the luminance value is observed between the certain area and the other area, it is determined that the outside of the vehicle is in the daytime or an external light is incident. In such a case, when it is clear from the difference image generated at this time that the driver narrows the eyes, it is determined that the driver narrows the eyes because of dazzle due to the light incident into the compartment of the vehicle from an outside such as the sunlight or headlight from an oncoming vehicle.

In contrast, if no difference or variation in the luminance value is observed between the certain area and the other area, it is determined that the outside of the vehicle is in the nighttime. When it is clear from the difference image generated at this time that the driver narrows the eyes, it can be determined that narrowing the eyes is caused by the sleepiness (i.e., the driver is drowsy).

As an optional aspect of the face image capture apparatus of the first or second aspect, the output condition determination device is configured to determine that the condition is satisfied when one of cases takes place, a first case when a time point for outputting the difference image is reached, a second case when a number of times of outputs of the difference image reaches a predetermined number of times, a third case when an output instruction is issued from an input device to which the difference image is inputted.

This enables a determination as to (i) whether to output one face image of the bright face image and the environment light face image while an influence of disturbance light is not removed from the both face images or (ii) whether to output the luminance value in the predetermined area of the one face image.

It will be obvious to those skilled in the art that various changes may be made in the above-described embodiments of the present invention. However, the scope of the present invention should be determined by the following claims.

What is claimed is:

1. A face image capture apparatus for a vehicle, the apparatus comprising:
   a camera configured to repeatedly capture a face image which is an image of a face of an occupant in the vehicle;
   a floodlight configured to irradiate the face of the occupant;
   a floodlight control device configured to control the floodlight with respect to at least one of (i) switching between turning on a light and turning off a light and (ii) a quantity of light at turning a light, so as to perform an adjustment of an irradiation state of a light radiated to the face of the occupant;
   an image capture control device configured to control a capturing time for capturing the face image in synchronization with the adjustment of the irradiation state;
   a difference image generation device configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated;
   an image output device configured to repeatedly output the difference image generated by the difference image generation device, the image output device including an output condition determination unit configured to determine whether a condition is satisfied for outputting at least one face image of (i) the bright face image and (ii) the environment light face image,
   wherein when it is determined that the condition is satisfied, the image output device is configured to output the at least one face image in addition to the difference image; and
   a sleepiness determination device configured to determine presence or absence of a sleepiness of the occupant based on
      (a) the difference image, which is outputted by the image output device, and
      (b) at least one face image of (i) the bright face image and (ii) the environment light face image, which are outputted by the image output device.

2. The face image capture apparatus according to claim 1, wherein
   the output condition determination device is configured to determine that the condition is satisfied when one of cases takes place, a first case when a time point for outputting the difference image is reached, a second case when a number of times of outputs of the difference image reaches a predetermined number of times, a third case when an output instruction is issued from an input device to which the difference image is inputted.

3. The face image capture apparatus according to claim 1, wherein
   a narrowing of the occupant's eyes in the difference image is determined to indicate the absence of sleepiness instead of the presence of sleepiness, when the luminance of the at least one face image is beyond a threshold value.

4. A face image capture apparatus for a vehicle, the apparatus comprising:
   a camera configured to repeatedly capture a face image which is an image of a face of an occupant in the vehicle;
   a floodlight configured to irradiate the face of the occupant;
   a floodlight control device configured to control the floodlight in at least one of (i) switching between turning on a light and turning off a light and (ii) a quantity of light at turning a light, so as to perform an adjustment of an irradiation state of a light radiated to the face of the occupant;
   an image capture control device configured to control a capturing time for capturing the face image in synchronization with the adjustment of the irradiation state;
   a difference image generation device configured to generate a difference image indicating a difference in a luminance between a bright face image and an environment light face image, the bright face image being captured by the camera in an irradiation state where a light of the floodlight is mainly radiated, the environment light face image being captured by the camera in an irradiation state where an environment light is mainly radiated;
   an image output device configured to repeatedly output the difference image generated by the difference image generation device, the image output device including an output condition determination unit configured to determine whether a condition is satisfied for outputting a luminance value of a predetermined area of a face image of at least one face image of (i) the bright face image and (ii) the environment light face image,
   wherein when it is determined that the condition is satisfied, the image output device is configured to output the luminance value in addition to the difference image; and
   a sleepiness determination device configured to determine presence or absence of a sleepiness of the occupant based on
      (a) the difference image and (b) the luminance value, which are outputted by the image output device.

5. The face image capture apparatus according to claim 4, wherein
   the predetermined area of the face image of the at least one face image is defined as an image area where the face of the occupant is captured as an image in the at least one face image.

6. The face image capture apparatus according to claim 4, wherein
   the output condition determination device is configured to determine that the condition is satisfied when one of cases takes place, a first case when a time point for outputting the difference image is reached, a second case when a number of times of outputs of the difference image reaches a predetermined number of times, a third case when an output instruction is issued from an input device to which the difference image is inputted.

7. The face image capture apparatus according to claim 4, wherein
   a narrowing of the occupant's eyes in the difference image is determined to indicate the absence of sleepiness instead of the presence of sleepiness, when the luminance of the at least one face image is beyond a threshold value.

* * * * *